United States Patent
Beecham et al.

(10) Patent No.: US 9,471,802 B2
(45) Date of Patent: *Oct. 18, 2016

(54) HYBRID FILE SYSTEMS

(71) Applicant: International Business Machines Corporation, Armonk, NY (US)

(72) Inventors: James D. Beecham, Houston, TX (US); William K. Bittner, Westford, MA (US); Venkateswararao Jujjuri, Beaverton, OR (US); Samuel W. Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,316

(22) Filed: Oct. 28, 2013

(65) Prior Publication Data

US 2014/0156706 A1 Jun. 5, 2014

Related U.S. Application Data

(63) Continuation of application No. 13/692,936, filed on Dec. 3, 2012.

(51) Int. Cl.
  *G06F 21/62* (2013.01)
  *G06F 17/30* (2006.01)
(52) U.S. Cl.
  CPC ..... *G06F 21/6218* (2013.01); *G06F 17/30233* (2013.01)
(58) Field of Classification Search
  CPC .......................... G06F 21/6209; G06F 21/6218
  USPC ................................................. 707/781, 783
  See application file for complete search history.

(56) References Cited

U.S. PATENT DOCUMENTS

| | | | |
|---|---|---|---|
| 6,934,799 B2 | 8/2005 | Acharya et al. | |
| 7,546,307 B2 | 6/2009 | Terrell, II | |
| 7,747,836 B2* | 6/2010 | Rajan et al. | 711/203 |
| 7,865,893 B1* | 1/2011 | Omelyanchuk | G06F 11/3644 710/1 |
| 8,104,083 B1* | 1/2012 | Sobel et al. | 726/17 |
| 2005/0228950 A1 | 10/2005 | Karr | |
| 2007/0061441 A1* | 3/2007 | Landis | G06F 9/5077 709/224 |
| 2010/0191783 A1 | 7/2010 | Mason et al. | |
| 2010/0228797 A1 | 9/2010 | Ou-Yang et al. | |

(Continued)

OTHER PUBLICATIONS

Frank Dabek et al., Wide-area cooperative storage with CFS, Dec. 2001, Jul. 13-16, 2010, 14 pages.

(Continued)

*Primary Examiner* — Brittany N Allen
(74) *Attorney, Agent, or Firm* — Lieberman & Brandsdorfer, LLC

(57) ABSTRACT

Methods may provide a virtual system with direct access to one or more sectors of a resource of a computer system. The method may include providing, by a computer system to a virtual system, first access control data associated with a regular computer file that corresponds to a resource on the computer system. The method may additionally include receiving, at the computer system, a direct read from or direct write to one or more sectors of the resource represented by the regular computer file from the virtual system. The method may further include hiding, at the computer system, a hidden computer file from the virtual system. The method may additionally include routing, at the computer system, the direct read from or direct write to the hidden computer file on the computer system.

10 Claims, 5 Drawing Sheets

(56) References Cited

U.S. PATENT DOCUMENTS

| | | | |
|---|---|---|---|
| 2011/0179214 A1* | 7/2011 | Goggin | G06F 3/061 711/6 |
| 2011/0179414 A1* | 7/2011 | Goggin | G06F 3/061 718/1 |
| 2011/0231443 A1* | 9/2011 | Hannel et al. | 707/776 |
| 2011/0239213 A1* | 9/2011 | Aswani | G06F 9/45558 718/1 |
| 2012/0102079 A1 | 4/2012 | French et al. | |
| 2013/0054979 A1* | 2/2013 | Basmov et al. | 713/193 |

OTHER PUBLICATIONS

Venkateswararao Jujjuri et al., VirtFS—A virtualization aware File System pass-through, 14 pages.

* cited by examiner

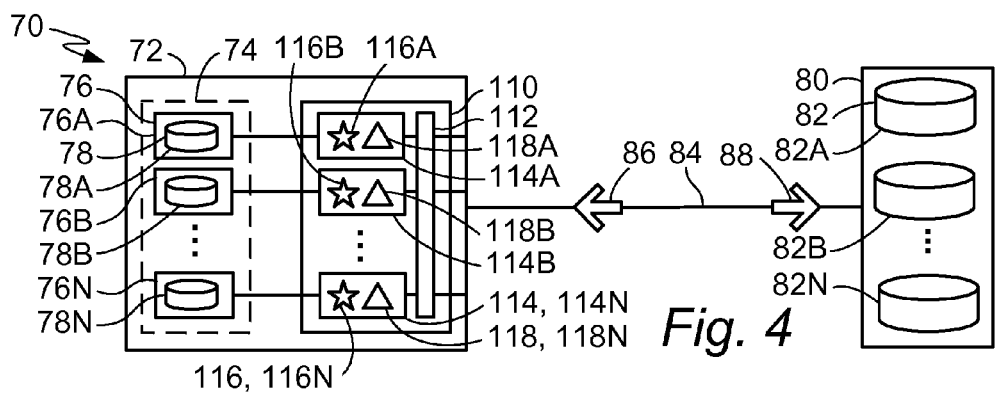
Fig. 4
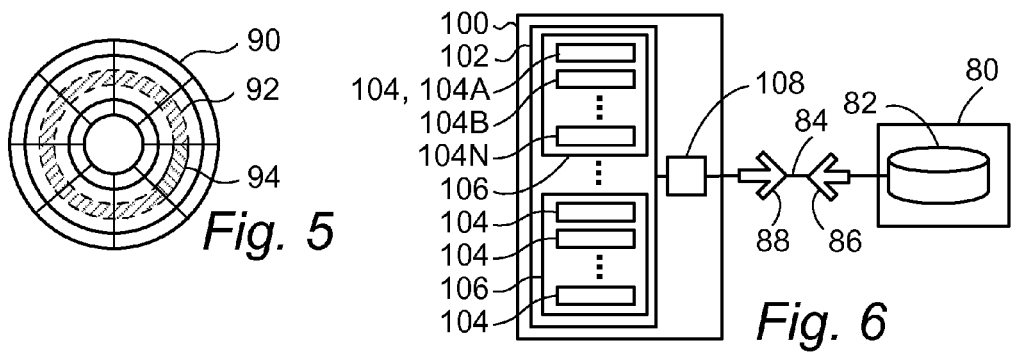
Fig. 5
Fig. 6
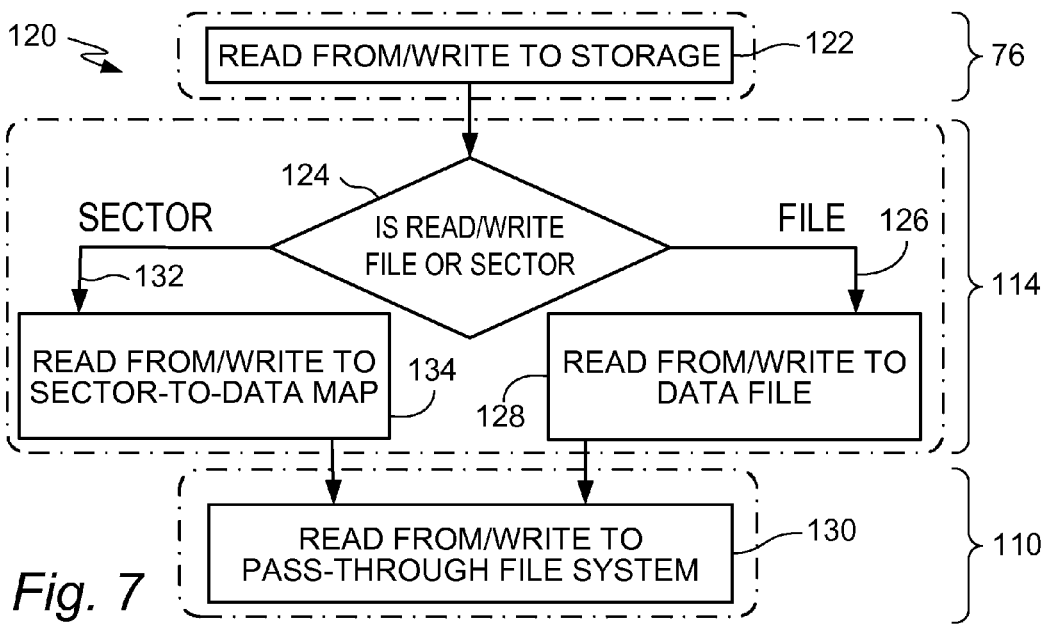
Fig. 7

US 9,471,802 B2

HYBRID FILE SYSTEMS

CROSS REFERENCE TO RELATED APPLICATION(S)

This application is a continuation patent application claiming the benefit of the filing date of U.S. patent application Ser. No. 13/692,936 filed on Dec. 3, 2012 and titled "Hybrid File Systems," now pending, which is hereby incorporated by reference.

BACKGROUND

The present inventions relate to data storage, and more particularly to file systems that allow direct reads and/or direct writes to one or more sectors by virtual systems.

Virtualization is a technology that allows a computer system to simulate another computer system. An actual machine that provides resources, such as processing, memory, and storage, is called a virtualization host. A simulated computer executing on a host is called a virtual machine (VM) or virtual system (VS). A VS may run an operating system and applications as if it were an actual machine. When a VS requests a hardware resource (such as storage), the host intercepts and fulfills the request. Request to read or write files may be fulfilled using a pass-through file system, where the host may communicate with actual storage on behalf of a requesting VS.

SUMMARY

According to one embodiment, a method may include providing, by a computer system to a virtual system, first access control data associated with a regular computer file that corresponds to a resource on the computer system. The first access control data is required for the virtual system to permit access to the regular computer file. The method may additionally include receiving, at the computer system, a direct read from or direct write to one or more sectors of the resource represented by the regular computer file from the virtual system. The method may further include hiding, at the computer system, a hidden computer file from the virtual system. The method may additionally include routing, at the computer system, the direct read from or direct write to the hidden computer file on the computer system.

Other features and advantages of this invention will become apparent from the following detailed description of the presently preferred embodiment(s) of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 4 is a block diagram of an example of hybrid storage system in accordance with the principles of the present inventions.

FIG. 5. is a block diagram of an example of a storage device in accordance with the principles of the present inventions.

FIG. 6 is a block diagram of an example of file system in accordance with the principles of the present inventions.

FIG. 7 is a flow chart showing an example of file and sector reads and writes in a hybrid storage system in accordance with the principles of the present inventions.

DETAILED DESCRIPTION

Figure 1:
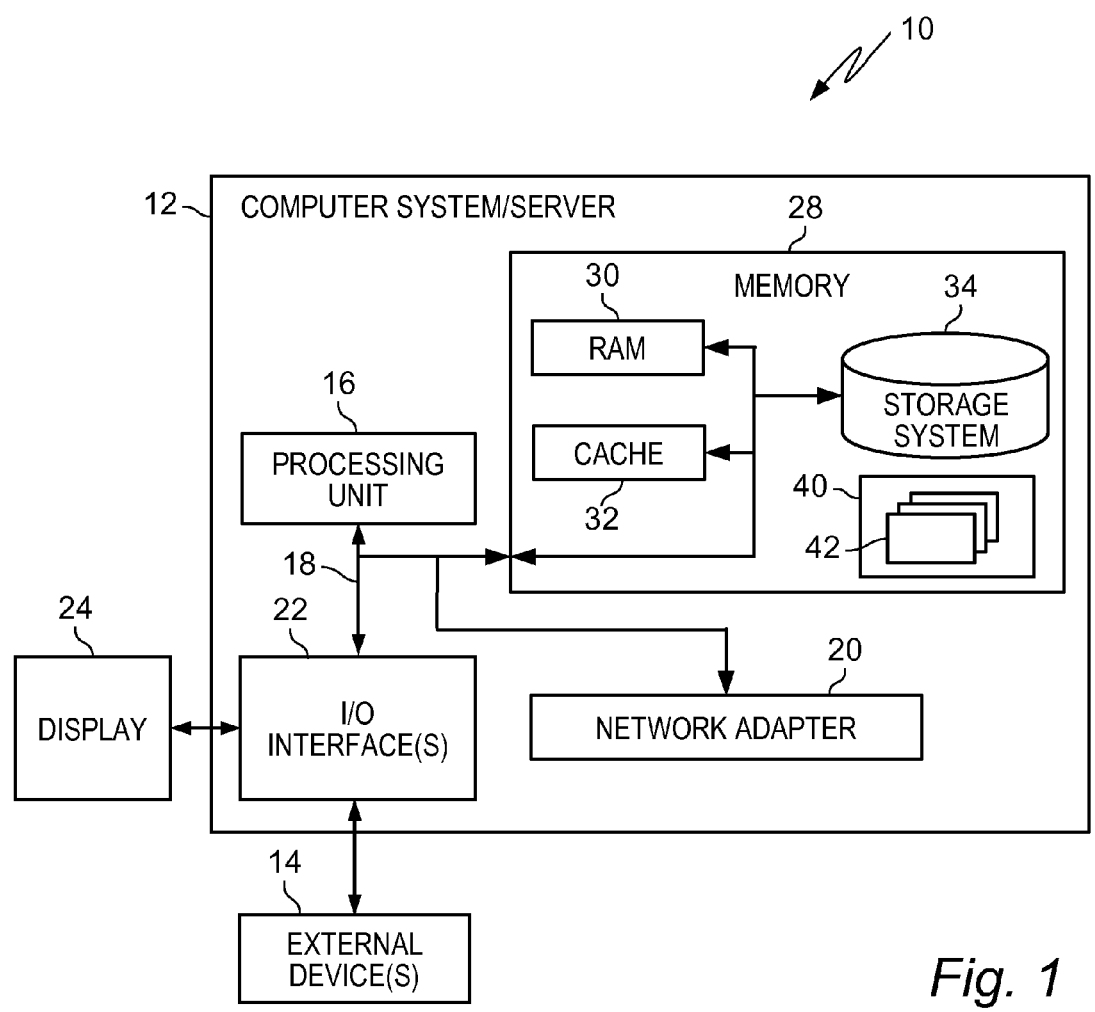
FIG. 1 is a block diagram of an example of a cloud computing node in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention may be implemented in conjunction with any other type of computing environment now known or later developed, including a distributed environment like clusters of nodes in a network wherein a node represents an independently operating system.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic and/or solid state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Although not shown, removable or non-removable solid-state storage systems that employ, for example, flash or other semiconductor memory may be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 may be stored in a kernel of the operating system.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
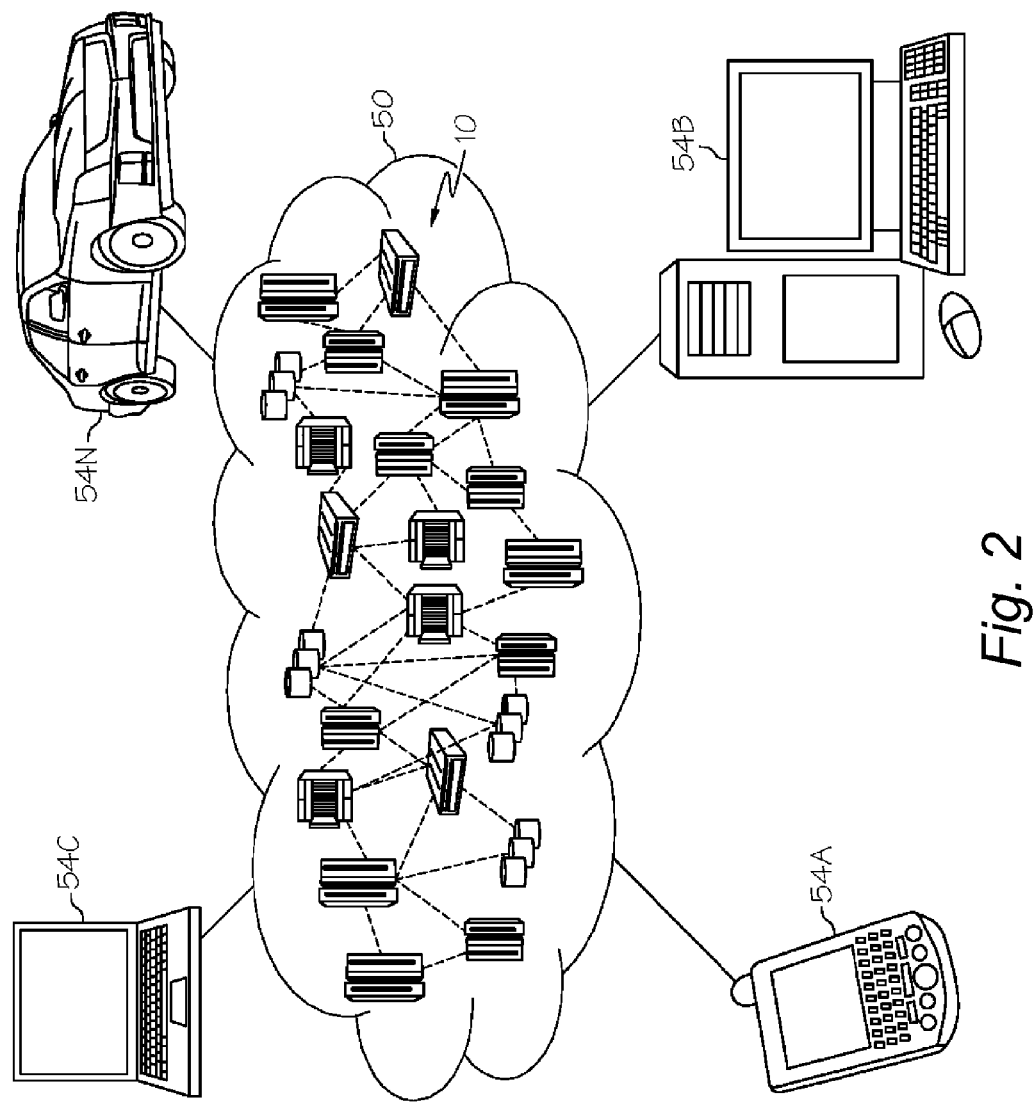
FIG. 2 is a pictorial representation of an example of a cloud computing environment in which illustrative embodiments may be implemented.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). In FIG. 2 and elsewhere, the "A-N" notation may indicate an indefinite range, where "A" refers to a first item and "N" refers to a second, third, etc. or subsequent item.

Figure 3:
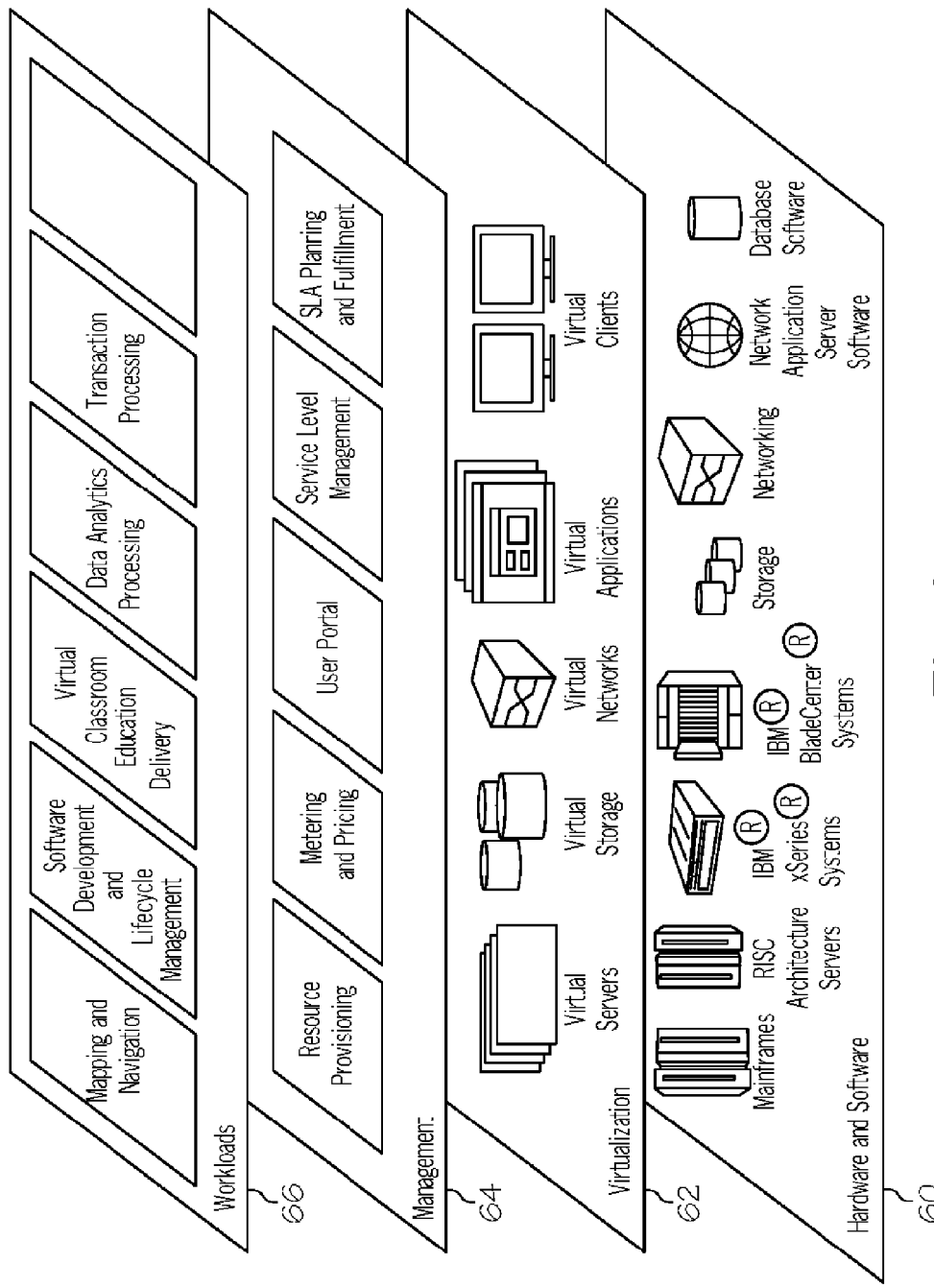
FIG. 3 is a block diagram of an example of abstraction model layers in which illustrative embodiments may be implemented.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification, such as login access, for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted above, systems, methods, and computer program products are disclosed herein for a hybrid block and pass-through file system.

Virtualization is a technology that allows a one computer system to simulate another computer system. The first computer system, called a virtualization host, is an actual, physical machine that provides resources such as processor, memory, and storage. The other computer system, simulated by and executing on the host, may be called a virtual machine (VM) or virtual system (VS). A VS may run an operating system (OS) and software applications as if it were an actual machine. When a VS requests a hardware resource, the host intercepts and fulfills the request. A host may run multiple VSs concurrently, and each VS may differ in capabilities and configuration. One VS may emulate a first OS for a computer, for instance, while a second VS may emulate a second (same or different) OS for a computer. A VS may simulate almost any sort of computer system or device including general-purpose computers and special-purpose systems such as storage systems or devices.

Referring also now to FIG. 4, a hybrid storage system, indicated generally at 70, may include one or more hosts 72, one or more storage systems 80, and one or more communication links 84. System 70 may include other, alternative, or additional elements, and may omit one or more elements.

Virtualization host 72 may be a computer system adapted to support one or more VSs 76. Host 72 may run a hypervisor 74, which may be a software system that creates an execution environment for each VS 76. Hypervisor 74 may intercept requests for processor, memory, storage, and other resources from each VS 76 and fulfill requests with native or accessible resources. Hypervisor 74 may run directly on the host hardware (a "bare metal" or Type 1 hypervisor) or above a host OS (a "hosted" or Type 2 hypervisor). Contemplated software for hypervisor 74 includes K Virtual Machine (KVM), VMWare, and IBM Power Hypervisor. Host 72 may be an example of a computer system/server 12 or cloud computing node 10. A host 72 sometimes may be referred to as a computer system.

VS 76 may be a simulated computer system executing on host 72. Each VS 76 may run an OS and software applications as if it were an actual and/or physical machine. VS 76 may have an associated user. For example, a user may be a person who has a guest account on host 72, which may start VS 76 for the user when the user logs in and shut down VS 76 when the user logs out. VS 76 may include virtual storage 78 visible to the user. For example, a first VS 76A may have a virtual storage 78A formatted in an NTFS file system, while a second VS 76B may have a virtual storage 78B formatted in a Linux file system. A user of VS 76 may interact with associated virtual storage 78 as if it were actual storage. Storage resource requests—for example, saving a file to virtual storage 78—may pass to hypervisor 74 and ultimately to actual storage. VS 76 may be a simulated or emulated example of a computer system/server 12 or a cloud computing node 10.

VS 76 running on host 72 does not have direct access to host resources. Instead, VS 76 can access host resources only through hypervisor 74, which therefore may separate each VS 76 from other hosted VSs 76. In effect, hypervisor 74 may create a private, protected operating space for each hosted VS 76 and isolate each a VS 76 from other VSs 76 on the same host 72. This protected space may be called a "sandbox." A sandbox creates security and privacy for resources inside the sandbox. If a VS 76 is running an application program, for example, then the processor and memory allocated to that application may enjoy protection against incursion by other VSs 76.

Storage system 80 may be a portion of system 70 that provides persistent storage of data for host 72, for example, to provide storage services for one or more VSs 76. System 80 may be local to host 72 (e.g., a hard drive installed in host 72) or remote from host 72 (e.g., a network file server accessible to host 72). System 80 may be an example of storage system 34, of an external device 14, of storage of Hardware and Software Layer 60, and/or of virtual storage of Virtualization Layer 62.

Storage system 80 may be or may include one or more storage devices 82, which may be components that provide actual, hardware-level storage. Devices 82 may provide bit-, byte-, block-, sector-, cluster-, and file-level storage, for example. Devices 82 may support partitions, file systems, and other features and may be arranged in arrays. Examples of devices 82 include hard disk drives, solid-state drives, tape storage devices, and/or optical storage devices. System 80 may include additional hardware and/or software elements, for example, subsystems that control, manage, and/or support storage devices 82.

Communication link 84 may include any data-exchange pathway between host 72 and system 80. For example, link 84 may include a SATA or other internal interface to a storage device 82 installed in host 72. For another example, link 84 may include wired and/or wireless networked access to a remote storage system 80. Link 84 may conduct data from storage system 80 to host 72, shown at data read 86, and/or from host 72 to storage system 80, shown at data write 88. Link 84 may include hardware and/or software components to support data transmission between system 80 and host 72. Link 84 may employ various media, conductors, devices, and protocols. Link 84 may be an example of a bus 18, a network (such as a local area network, wide area network, and/or the Internet), and/or a cloud computing environment 50.

FIG. 4 shows a generalized functional or conceptual illustration of system 70 in a client-server environment. These concepts and relationships may be expressed in other architectural configurations. For example, host 72 may be a stand-alone computer system, not connected to a network, that runs multiple VSs 76, for example, to run multiple OSs on a freestanding host 72. In this configuration, system 80 and link 84 may be internal portions of host 72. For another example, host 72 may support one or more VSs 76 that provide networked computation resources for remote thin-client devices (not shown). In this configuration, link 84 may include the Internet, and system 80 may be a cloud-based data storage resource.

Virtual storage 78 and/or other software and systems emulated by VS 76 may include paravirtualized elements. Paravirtualization may refer to the use of a modified component, such as an interface to a resource (e.g., storage). For example, a standard file system (NTFS, for example) designed for execution by an actual computer may run inefficiently when emulated by VS 76 and hypervisor 74. Paravirtualizing a file system for use as virtual storage 78 may in effect bypass or replace inefficient portions of the file system with portions optimized for emulation by VS 76 and hypervisor 74.

Referring now also to FIG. 5, storage device 82 may store data on one or more disks 90 in a system of tracks 92 and sectors 94. Track 92 may be understood as an annular data-storage area on the surface of disk 90, with multiple tracks 92 arranged concentrically. A geometric sector of disk 90 may divide track 92 into track sectors 94, each a data-storage region of track 92. Each sector 94 may store user data plus control data, such as address and error correction data. Logically or physically contiguous sectors 94 may be organized in allocation units called "clusters." The term "disk" may include any data storage medium, and the term "sector" may include "cluster" and other data allocation or storage units.

FIG. 5 shows an abstraction of tracks 92 and sectors 94 in a context of disk-based storage. Tracks 92 and sectors 94 may represent logical rather than physical organization of storage. For example, a solid-state drive may store data, organized in logical tracks 92 and sectors 94, using semiconductor memory not closely related to rotating disk storage. Geometric terms such as "disk," "annular," and "sector" may represent historical or metaphorical usage.

Referring now also to FIG. 6, a computer OS 100 or other system software may include or maintain a file system 102 to organize, store, and/or retrieve data. File system 102 may include a plurality of files 104. File 104 may be a resource for storing data, for making data available for use by programs, or for providing access to a system feature, function, or device. File 104 may have an associated name, user, size, and other attributes. File system 102 may maintain more than one type of file 104. For example, a regular computer file may be a file 104 serving as a container to store data, while a special computer file may be a file 104 serving as an interface to a device.

File system 102 may include a plurality of directories 106. Directory 106 may function as an organizational mechanism for grouping files 104 and/or other directories 106. File system 102 may include other capabilities, such as features for generating and storing metadata about files 104 and directories 106, for maintaining the integrity of file system 102, for encrypting and decrypting files 104, and so on.

File system 102 may store data including files 104 on storage system 80 or device 82 using sectors 94 as an underlying storage unit. File system 102 may maintain records of used sectors 94, unused sectors 94, and associations between higher-level data units (e.g., files 104 and directories 106) and lower-level data units (e.g., sectors 94). File system 102, by presenting an abstracted storage model based on files 104 and directories 106, may be more convenient than a hardware-oriented storage model based on sectors 94.

OS 100 and/or file system 102 may include an access control system to govern access to resources, such as files 104, programs, and devices. An access control system, such as a permissions system, may include features that identify and authenticate users, associate users in groups, and grant or deny access rights to specified resources to specified users or groups. For example, a permissions system may grant a given user (identified by a unique user ID) the right to view, but not change, a given file 104.

An access control system may store access control data associated with a file 104 as a portion of file 104. Access control data may include regular and/or extended file attributes. Regular attributes may include data defined by OS 100 and/or file system 102 for a specified purpose. For example, regular attributes may include data governing standard read, write, and execute permissions for the associated file 104 for users, groups, and others. Extended attributes may include data or metadata not defined as regular attributes. For example, a programmer may employ extended attributes as a feature of file system 102 to store data in file 104 about file 104, such as its author, character encoding, or checksum.

A block of data is a sequence of bits or bytes of a given length, called the "block size." For example, a block may be 512 bytes long. A device that consumes, generates, or moves data in blocks may be called a "block device." A storage device 82 may be a block device. Data exchanged with a storage device 82 may be organized in blocks to facilitate communication.

A regular computer file may be file 104 created for storing ordinary data. A special computer file may be file 104 created for a purpose other than storing data in a regular file. For example, a symbolic link may be a special file that stores a reference to a regular file. The regular file acts as a storage container, while the link acts as a pointer. An OS, such as UNIX and its kin, may use a special file to represent a resource, such as a storage device or a system feature. The represented resource may be a physical device (e.g., a CD-ROM drive) or a non-physical resource (e.g., a random number generator). A special file that represents or implements a non-physical device may be called a "pseudo-device file."

A special file that represents a resource may be accessible in OS 100 and/or file system 102 and may act as an interface to the corresponding resource. For example, a special file that corresponds to a storage device 82 may act as an interface to the device 82 that allows programs to interact with the device 82 through standard I/O function calls. A special file for a block device, such as a hard drive or CD-ROM drive, may be called a block device file or BDF. BDF 108 for a storage device may support, for example, buffered reads to (and/or writes from) the storage device, where the buffer size may be the block size.

A device, such as a block device, may be a partitioned device. Partitioning may refer to the division of storage device 82 or system 80 into multiple logical storage units. For example, a physical storage device 82, such as a hard drive may be divided into multiple logical drives, allowing a computer system, such as host 72, to treat the physical drive as if it were multiple drives. Each logical drive, called a "partition," may have attributes and features, such as a size, a file system, and so on. Partitioning may be used to store more than one OS on the same drive, to separate OS files from applications and data files, and so on. BDF 108 may be adapted to support a storage device that has been divided into partitions.

File system 102 may rely on an OS-level BDF 108 as in interface to storage device 82 or storage system 80. For example, when writing data file 104 to storage system 80, file system 102 may direct file 104 to BDF 108, which may split file 104 into blocks for transmission to storage system 80 or device 82. System 80 or device 82, receiving blocked data, may store the blocks in sectors 94. BDF 108 may provide an interface to storage not only for file system 102, but also for other programs and devices. For example, a program may obtain access to storage via function calls that directly address BDF 108, bypassing file system 102 (if present). Direct block-device operations may enable lower-level data transfers such as sector-based transfers, without the file and directory abstractions of file system 102.

Special computer files may have regular file attributes and lack extended file attributes. In order for host 72 or storage system 80 to store data (metadata) relating to a special file in extended attributes, host 72 or system 80 may create a regular file that corresponds to the special file. Host 72, system 80, and other actual or virtual systems or devices may then treat the special file as a regular file, for example, to store data in extended attributes of the corresponding regular file. For example, a regular file may act as a proxy for BDF 108, thereby enabling an association between BDF 108 and extended attributes stored in the corresponding regular file. A regular file that acts as a proxy for a special file may be referred to as "a regular computer file that corresponds to a resource on a computer system."

Referring again to FIG. 4, host 72 and hypervisor 74 may store and/or retrieve data on behalf of one or more hosted VSs 76 via a pass-through file system 110 or PTFS 110. PTFS 110, which may be an example of file system 102, may pass data reads to and/or writes from VS 76 via hypervisor 74 to storage system 80. PTFS 110 may rely on storage BDF 112, which may be an example of BDF 108, as an interface to file-based storage on storage system 80. From the perspective of a user of VS 76, PTFS 110 may maintain an illusion of actual local or networked storage. For example, a file 104 read from virtual storage 78 may generally look and act like file 104 read from a local hard drive on an actual computer. In reality, PTFS 110 may read file 104 from a distant storage system 80, and the file systems used by virtual storage 78 of VS 76, hypervisor 74, and storage system 80 may differ. For example, a user of VS 76 may see an emulated NTFS file system, while hypervisor 74 may employ a Linux-based PTFS 110, while storage system 80 may employ a file system selected for back-end storage. Despite the heterogeneous environment, PTFS 110 may endeavor to transfer data quickly and transparently, as if VS 76 had a dedicated local or remote storage device.

Storage device 82 or system 80 may be divided into partitions, and storage BDF 112 may be adapted to support a partitioned storage device. PTFS 110 may include features that allow host 72 to support multiple VSs 76 and to store data for each VS 76 on storage system 80. Host 72 may have an associated identifier (such as a user ID). Host 72 may be subject to an access control system of PTFS 110 and/or system 80 that uses the identifier to govern access to files and other resources of system 80. Data transfers by host 72 to or from system 80 on behalf of various VSs 76 accordingly may occur in association with a single host identifier, subject to permissions associated with the host identifier, regardless of the VS 76 that initiated a given data transfer. To distinguish between VSs 76 in storage, PTFS 110 may rely on extended file attributes to distinguish files and other data associated with a given VS 76 from files and other data associated with other VSs 76.

For example, host 72 may support a first VS 76A and a second VS 76B. Via PTFS 110, file 104 saved by first VS 76A may pass to host 72 and to storage system 80. On system 80, the regular file attributes of the file may identify host 72 as the owner, without indicating VS 76A. File 104 saved by second VS 76B similarly may yield a second file on system 80 where the regular attributes indicate host 72 as the owner, without indicating VS 76B. To distinguish files of VS 76A from those of VS 76B, host 72 may store a VS identifier as an extended attribute of each file associated with a VS 76. A VS identifier may be, for example, a series of characters assigned to, unique to, and associated with each VS 76. For example, files of first VS 76A may have a VS identifier associated with VS 76A, files of second VS 76B may have a different VS identifier associated with VS 76B, and so on for each VS 76A-N. Host 72 and PTFS 110 may then rely on the VS identifier (an extended attribute) to grant access by each VS 76 to the proper files. For example, PTFS 110 may grant VS 76A access to files that have a VS identifier associated with VS 76A and deny VS 76A access to files that have a VS identifier associated with VS 76B.

PTFS 110 may be able perform only certain types of data transfer on behalf of a VS 76. For example, PTFS 110 may be able to read and write files 104 to storage system 80 but unable to read and write data directly to storage BDF 112, for example, to perform a direct-block or direct-sector read or write to system 80. Programs that rely on file-based data transfers may run as expected on VS 76. Programs that attempt to read or write data directly to a block device 108 (or 112) or sector(s) 94 may fail outright or run abnormally. These lower-level reads 86 and writes 88 from VS 76 may fail because PTFS 110 may not virtualize a lower-level data-access model. For example, if a user of VS 76 attempts to install a boot loader, the installation may fail on VS 76 even if it would succeed on an actual computer. For another example, if a BIOS associated with or emulated by VS 76 requests a direct-sector read, the read may fail.

This partial emulation of data transfers—file-based transfers but not direct-block or direct-sector transfers—by a conventional PTFS 110 may introduce differences between a VS 76 and an actual computer emulated by VS 76. Permitting direct-block and direct-sector reads 86 and writes 88 in addition to file-based reads 86 and writes 88 may reduce or remove this incompatibility and increase the user perception that a VS 76 is an actual computer.

Virtual direct storage system 114 or VDSS 114 may be a portion of system 70 that works in conjunction with PTFS 110 to enable direct-block and/or direct-sector reads and writes in addition to file-based reads and writes. VDSS 114 may include functions that distinguish file-based transfers from direct transfers, for example, to handle file transfers differently from direct transfers. VDSS 114 may include one or more sector BDFs 116 (described below) that may include or refer to one or more sector-to-data files 118 (described below). VDSS 114 may include functions that read and write sector identifiers and associated sector data to file 118. For direct reads, VDSS 114 may include functions that look up requested sector data in file 118 and return the sector data to VS 76. For direct writes, VDSS 114 may include functions that save a sector identifier and associated sector data to file 118. VDSS 114 may include functions that store file 118 as a regular file that may include regular and extended attributes. For file-based data transfers from VS 76—including transfers of file 118—VDSS 114 may include functions that pass the file-based read or write to PTFS 110, for example, for storage on storage system 80. Storing direct reads and writes in a sector-to-data file 118 enables storage of sector data via a file-based PTFS 110, thereby emulating direct sector reads and writes for VS 76.

Referring now also to FIG. 7, system 70 may implement operations including those of flowchart 120. At 122, VS 76 may request a data read 86 (file or sector) from or data write 88 (file or sector) to storage system 80. For example, an application running in VS 76 may open a file, write data to a sector, or otherwise request or receive a data-transfer operation. At 124, VDSS 114 may examine read 86 or write 88 to determine if the data transfer is file-based or sector-based. At 126, VDSS 114 may pass file-based transfers to PTFS 110, as shown at 128 and 130. At 132, VDSS 114 may pass sector-based transfers to sector BDF 116, which at 134 may read or write sector data to sector-to-data map of sector-to-data file 118. For sector writes, VDSS 114 may, when appropriate, write file 118 to storage system 80 via PTFS 110 at 130. For sector reads, VDSS 114 may, when appropriate, retrieve file 118 from system 80, look up the sector data to be read from file 118, and pass the sector data via host 72 and hypervisor 74 to the requesting VS 76 at 130. PTFS 110 may use storage BDF 112 as an interface to actual storage on storage system 80 at 130.

VDSS 114 may include one or more sector BDFs 116. Sector BDF 116 may be an example of BDF 108 that acts as an interface to storage for direct-block and/or direct-sector data transfers to or from VS 76. Sector BDF 116 may be a special computer file that may have a corresponding regular computer file, for example, to store extended file attributes of sector BDF 116. Sector BDF 116 may have a scalable size and may reside at the root level of PTFS 110. Sector-level storage implemented by sector BDF 116 may be understood as an emulated (non-physical) resource. Sector BDF 116 accordingly may be an example of a pseudo device file. Sector-level storage implemented by sector BDF 116 may be partitioned, and sector BDF 116 may implement an interface to a partitioned device.

Figure 8:
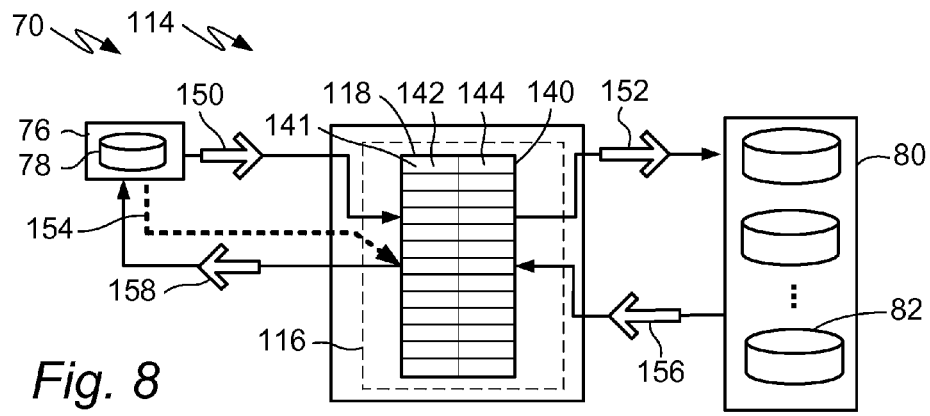
FIG. 8 is a block diagram that shows an example of a virtual direct storage system (VDSS) in accordance with the principles of the present inventions.

Referring now also to FIG. 8, sector BDF 116 may include, access, or refer to one or more sector-to-data files 118. File 118 may be a regular computer file 104 or other resource of VDSS 114 used by sector BDF 116 to store sector data. File 118 may include a map 140 that contains one or more records 141, each of which may include sector identifier(s) 122 and associated sector data 144. An identifier 142, such as an actual or emulated sector address, may act as a key for looking up the corresponding sector data 144 in map 140. Identifier 142 may identify, for example, one sector 94, a contiguous or discontiguous range of sectors 94, and/or a set of sectors 94. Emulated sector addresses may follow a format of sector addresses on physical storage devices, so that VS 76 may interact with sectors 94 emulated via map 140 as if emulated sectors were physical sectors. Sector data 144 may include any type of information read or written by VS 76 to one or more sectors 94 via sector BDF 116. Data 144 may be unencrypted or encrypted. Map 140 may be understood as a table of associations between sectors and sector data.

Sector-to-data file 118 may be a regular file 104 and therefore compatible with PTFS 110. Storing and/or accessing file 118 via PTFS 110 may provide actual, persistent storage for sector-based transfers stored in map 140 of file 118. In short, when sector read/write operations are called from the kernel, from the BIOS, or otherwise, the corresponding sector-to-data associations are stored in map 140.

Sector-to-data file 118 and/or map 140 may include data other than or in addition to sector identifiers 142 and sector data 144. For example, file 118 may store file names, VS identifiers, user identifiers, and other data, associated with file 118, identifiers 142, and/or data 144. For another example, if the pseudo device of sector BDF 116 is a partitioned device, then map 140 or file 118 may be divided into sections, each with an associated partition identifier, to allow file 118 to store—and BDF 116 to address—partitioned data. Alternatively, record 141 may include a partition identifier, thereby recording an association between a partition identifier, sector identifier 142, and sector data 144. "Sector address" and its variations herein includes any indicia for (or method for) identifying one or more sectors.

In an embodiment, sector-to-data file 118 may implement map 140 as a hash table. A hash table is a method for looking up values. Given a set of values, each with an associated key, a hash function computes an index from each key, yielding an array that associates each value with its hash index. Looking up a value by its index may be more efficient than searching for the value by its key. In map 140, sector identifiers 142 may act as keys, and sector data 144 may act as values. A hashed implementation of map 140 may generate hash indexes from sector identifiers 142, for example, to reduce latency during look-up operations.

Referring back to FIG. 4, each VS 76A-N has a corresponding, distinct VDSS 114A-N including a distinct sector BDF 116 and a distinct sector-to-data file 118. Embodiments of VDSS 114 may differ from the logical abstraction of FIG. 4. In an embodiment, a sector BDF 116 may provide a storage interface for a plurality of VSs 76, each with an associated file 118. For example, one sector BDF 116 may provide a storage interface for all VSs 76 of host 72 and may store sector data in multiple files 118, one file 118 for each VS 76. In another embodiment, one file 118 may store data for a plurality of VSs 76, each identified in file 118 by a unique VS identifier.

In FIG. 4, sector BDF 116 is depicted as separate from storage BDF 112. As shown, sector BDF 116 may be a pseudo device file accessed by VDSS 114 for virtualized low-level reads and writes. Storage BDF 112, in contrast, may be a block device file accessed by PTFS 110 as an interface to actual file-level reads and writes on storage system 80. An implementation of sector BDF 116 and storage BDF 112 may differ from the abstraction of FIG. 4. For example, storage BDF 112 may be modified to include features of sector BDF 116, yielding a combined BDF 112 or 116 may handle both block- or sector-based and file-based data transfers.

PTFS 110 may include or encapsulate VDSS 114, however other implementations may differ. For example, PTFS 110 may be modified (at the source-code level, for example) to add features of VDSS 114. The result may be a unified storage system that can handle both file-based and sector-based data transfers on behalf of VS 76. A unified embodiment may in general merge the functions of PTFS 110 and VDSS 114 as a unified storage system that distinguishes between different types of data transfer and handles them as separate cases.

A boot process of VS 76 may rely on block-device and/or on sector-level access to storage, for example, to read a boot sector from a storage device. This direct read may occur before the creation of an OS and file system and therefore cannot rely on an OS and file system. A boot process of VS 76 thus may be incompatible with a file-based conventional PTFS 110.

In hybrid storage system 70, host 72 may obtain access to sector-to-data file 118 during the boot process, on behalf of booting VS 76. During the boot process, host 72 may create VDSS 114, create or access sector BDF 116, and access file 118 from storage system 80 via PTFS 110. Host 72, having access to file 116, accordingly may read data from file 118 on behalf of booting VS 76.

For example, file 118 may store as sector data boot code that (on a physical machine) would be stored in ROM and/or BIOS and that would (on a physical machine) be read and executed on power up. Host 72 may read and execute equivalent boot code from file 118 on behalf of booting VS 76. File 118 may additionally or alternatively store boot-sector data that (on a physical machine) would be read from storage by the boot code read from ROM and/or BIOS. This boot-sector data may, for example, contain instructions that continue the boot process, for example, by loading an OS, obtaining access to a file system, and so on. Host 72 may read and execute equivalent boot-sector data from file 118 on behalf of booting VS 76. Boot code and/or boot-sector data may be implemented as the first sectors of map 140, emulating the boot sector of a physical machine. Boot code and/or boot-sector data may be paravirtualized.

Boot-time access by host 72 and/or VS 76 to VDSS 114 and sector BDF 116 may remove the need for an option ROM. On boot, the boot sectors of map 140 may be passed to the (actual or emulated) BIOS, as if sector BDF 116 were an actual block device. Hybrid storage system 70 thus may enable booting of VS 76 over PTFS 110.

Referring back to FIG. 8, system 70 and VDSS 114 may be better understood by detailing a representative direct read and a representative direct write. An example of a data write operation within VDSS 114 may proceed as described below. VS 76 may issue a direct sector write 150 that may include a sector identifier 142 plus sector data 144 (user data) to be written to the identified sector(s). VDSS 114 may detect direct sector write 150, extract sector identifier 142, perform validity checks on identifier 142, and write identifier 142 and associated sector data 144 as a new record 141 of map 140. VDSS 114 may when appropriate write sector-to-data file 118 via PTFS 110 to storage system 80, for example, to make a persistent record of map 140.

An example of a data read operation within VDSS 114 may proceed as described below. VS 76 may issue a direct sector read request 154 that may include one or more sector identifier(s) 142 and in effect ask for the sector data 144 stored at identifier(s) 142. VDSS 114 may detect direct sector read request 154, extract identifier(s) 142, if appropriate retrieve all or part of file 118 via at storage read 156, look up record(s) 141 associated with identifier(s) 142 in map 140, and extract associated sector data 144 from record(s) 141. VDSS 114 may then return the requested data to VS 76 as sector read return 158, which may include sector data 144 and/or records 141 (in other words, just the data 144 and/or both the identifier 142 and associated data 144).

Additional operations and/or communications not shown in FIG. 8 may occur. For example, VDSS 114 may perform validity checks, for example, on extracted sector identifiers 142 and/or sector data 144) and pass error messages, confirmation messages, and other handshaking back to VS 76.

Figure 9:
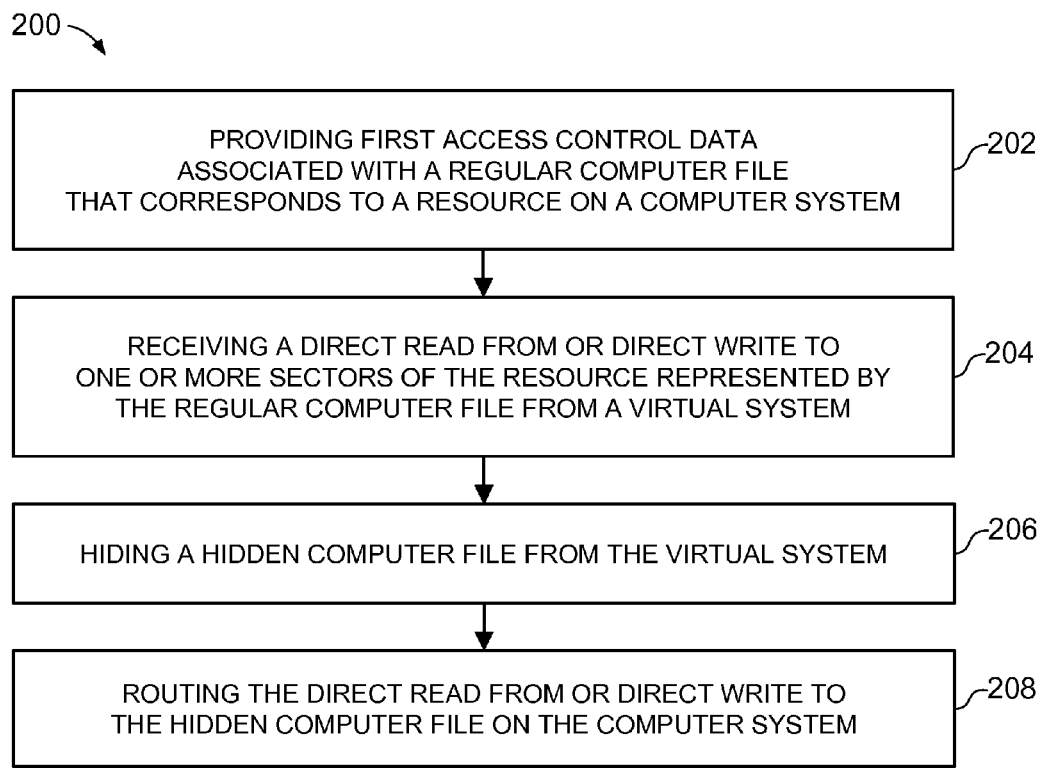
FIG. 9 shows an example of a method for providing a virtual system with direct access to one or more sectors of a resource of a computer system in accordance with the principles of the present inventions.

Referring now also to FIG. 9, a method 200 for providing a virtual system with direct access to one or more sectors of a resource of a computer system may include providing, at 202, by a computer system to a virtual system, first access control data associated with a regular computer file that corresponds to a resource on the computer system, the first access control data required for the virtual system to permit access to the regular computer file; receiving, at 204, at the computer system, a direct read from or direct write to one or more sectors of the resource represented by the regular computer file from the virtual system; hiding, at 206, at the computer system, a hidden computer file from the virtual system; and routing, at 208, at the computer system, the direct read from or direct write to the hidden computer file on the computer system. Method 200 may include other, alternative, or additional elements; may omit one or more elements; and/or may follow a different sequence of elements from that listed At providing 202, a "computer system" may be or may include a virtualization host 72 that may run hypervisor 74 and support one or more virtual systems 76 or VSs 76. A "regular computer file that corresponds to a resource" may be a regular file 104 that corresponds to a special computer file. A "resource" may be a storage resource, such as a VDSS 114 or a storage system 80. The special file and corresponding regular file may be a sector BDF 116 or storage BDF 112 that provides an interface to the storage resource. Regular file 104 may have extended file attributes that allow host 72 to maintain or enforce an extended access control system that can distinguish between multiple VSs 76 running on host 72, for example, to selectively grant or deny access by a given VS 76 to a resource such as a VDSS 114 or storage system 80.

At 206, "providing first access control data" generally may include any operation by which host 72 grants to VS 76 access to a resource, for example, by granting VS 76 access permission to a regular or special file that corresponds to (or provides an interface to) the resource. "Providing first access control data" particularly may include any operation that grants VS 76 access to VDSS 114 via sector BDF 116 or to storage system 80 via storage BDF 112.

In an embodiment, host 72 may create an instance of a sector BDF 116 (and/or a regular computer file that corresponds to the instance of the sector BDF 116) on behalf of VS 76, then grant VS 76 access to sector BDF 116, for example, via the regular file corresponding to BDF 116.

Receiving at 204 may include receiving, by computer system (host 72), a direct read by or direct write from VS 76 to one or more sectors 94 of the resource represented by the regular computer file. Receiving at 204 may include generating, by VS 76, a direct data read or write. For example, VS 76 may run an application program such as a software installation program that writes data directly to one or more sectors 94. VS 76 may include virtual storage 78, which may be an emulated storage system 80 or device 82 accessible from within VS 76. To the user and software of VS 76, virtual storage 78 may resemble actual storage. VS 76 accordingly may direct both file-based and sector-based storage requests to virtual storage 78.

Receiving at 204 may include passing a direct read or write from VS 76 via hypervisor 74 to host 72, which receives the direct read or write from VS 76. In virtuality, hypervisor 74 may maintain virtual storage 78 as an image of storage for VS 76, so that VS 76 may interact with emulated storage as if it were actual storage. In actuality, hypervisor 74 may intercept data transfers (including direct reads and direct writes) directed at virtual storage 78 and fulfill the storage requests via VDSS 114. In virtuality, VS 76 may be understood and discussed as if it were distinct physical computer, even though in actuality host 72 may perform all processing of VS 76, hypervisor 74, and host 72. In actuality, "receiving" may be understood as a process or program of host 72 receiving a communication from another process or program, namely VS 76, of host 72.

Referring back to FIG. 7, receiving at 204 may include detecting, by VDSS 114, whether a data read or write is a file-based or sector-based transfer. For a file-based transfer, receiving 204 may include storing extended file attributes in the file being transferred (e.g., to add data identifying the VS 76 reading or writing the file) and passing the file to PTFS 110 for storage by storage system 80. For a sector-based transfer (in other words, a direct read or write), receiving at 204 may include passing or addressing the direct read or write to sector BDF 116, which may act as an interface to (emulated) sector-based storage, for example, by maintaining a sector-to-data file 118 that stores sector identifiers 142 mapped to sector data 144. Receiving at 204 may include advancing to hiding at 206 and/or routing at 208.

In an embodiment, receiving at 204 may include receiving a request to boot VS 76. Host 72 may not permanently maintain VS 76. Instead, host 72 may dynamically maintain VS 76, starting VS 76 at need or on request and shutting down VS 76 at completion of a task, at a specified time out interval, or on request. A "request to boot" may include any signal or command to start up VS 76. For example, a "request to boot" may be a signal within hypervisor 74 triggered by (for example) a feature of hypervisor 74 that allows an administrator to start VS 76. For another example, hypervisor 74 may receive a request to boot from an external source. For example, a remote user may log on to a networked system that includes host 72, and the system may issue a request to boot to host 72, for example, to start VS 76 on behalf of a user at log-in. Receiving a request to boot may include creating, by hypervisor 74, a bootable VS environment that anticipates the bootstrap process and ultimately receive VS 76.

In an embodiment, receiving a request to boot may include executing a bootstrap loader stored in the hidden computer file—that is, in sector-to-data file 118 associated with the booting VS 76. In an actual machine, a "bootstrap loader" is a program that resides in non-volatile memory (ROM and/or BIOS) and runs at power up. A bootstrap loader may read boot-sector data from a storage device to obtain start-up code that may ultimately load an OS, file system, and so on. The low-level data read from the boot sector may occur before the creation of the OS and file system. In an embodiment, receiving at 204 may include extracting, from the request to boot, data identifying the VS 76 to be booted. Receiving at 204 may include obtaining, by host 72 from storage system 80, a sector-to-data file 118 associated with the booting VS 76. Receiving at 204 may include reading and executing, by host 72 from file 118, a bootstrap loader stored in file 118 (emulating the ROM-based power-up of an actual computer).

Receiving at 204 may include reading and executing, by host 72, boot-sector data stored in sector-to-data file 118 (emulating the boot-sector phase of the boot process of an actual computer). Host 72 and hypervisor 74 may execute the bootstrap loader and perform the boot process on behalf of the booting VS 76, so that the booted VS 76 resides in the bootable VS environment created by hypervisor 74. Receiving at 204 may include reading one or more files from storage system 80 that contain data describing or supporting VS 76. For example, host 72 may store a VS image file that includes an OS, applications, utilities, end-user data, license data, and other resources used by the executing VS 76. Receiving at 204 accordingly may include obtaining and installing resources, for example, an OS, applications, and so on, from a VS image file into the protected execution space created by hypervisor 74 for booting VS 76.

In an embodiment, receiving at 204 may include receiving an encrypted direct read or encrypted direct write to one or more sectors of the resource represented by the regular computer file. Receiving at 204 may include encrypting, by VS 76 or host 72, sector data 144. Encrypting may include passing data 144 through one or more encryption algorithms, which are programs that cryptographically encode data, for example, to make it unreadable to anyone not possessing a correct cryptographic key. Host 72 may store encrypted data 144 instead of unencrypted data 144 in map 140, which simply stores data 144 as a sequence of bits and bytes, independent from any encryption. Only sector data 144, and not sector identifiers 142, are encrypted. Host 72, given an identifier 142, may retrieve encrypted data 144 from map 140. Host 72 may (if appropriate) decrypt data 144 before passing data 144 to VS 76. Alternatively, host 72 may pass encrypted data 144 to VS 76, which may (if appropriate) decrypt data 144.

At hiding 206, a "hidden computer file" may be or may include a sector-to-data file 118, which may provide persistent, file-based storage for sector-based data transfers by VS 76. File 118 may be a regular computer file 104, stored on storage system 80, that implements a sector-to-data map 140 for VS 76. Map 140 may be implemented as a hash table, for example, to reduce the time required to retrieve data. Hiding at 206 may including determining whether file 118 already exists for VS 76. For example, when hypervisor 74 starts VS 76, hypervisor 74 may query a registry to determine if file 118 already exists for VS 76. If none exists, hiding at 206 may include creating a new file 118, associating file 118 with the corresponding VS 76, storing file 118 in storage system 80, and updating the registry to include file 118 and to record identifying indicia. Indicia may include, for example, a file name associated with file 118, an identifier of the associated VS 76, and so on. If file 118 already exists, hiding at 208 may include obtaining, by host 72, local or remote access to the file 118. Obtaining access may include copying file 118 from storage system 80 to host 72.

Hiding at 206 may include providing access by VDSS 114 to file 118. Additionally, hiding at 206 may include denying direct access by VS 76 to file 118. For example, hypervisor 74 may maintain a protected environment for VS 76, sometimes called a sandbox. VS 76 may "see" resources its own side of hypervisor 74 (inside the sandbox) but not directly "see" resources on the host side of hypervisor 74 (outside the sandbox). Hypervisor 74 may use PTFS 110 (on the host side of hypervisor 74, hidden from VS 76) to fulfill storage requests by VS 76. Hiding at 206 accordingly may include maintaining access by VDSS 114 to file 118 on behalf of VS 76 but sandboxed outside the scope of VS 76. For example, host 72 may store file 118 at the root of PTFS 110. Hiding at 206 may include stepping to routing 208.

In an embodiment, hiding at 206 may include hiding, at the computer system (host 72) a partitioned device from VS 76. The pseudo device of sector BDF 116 may be a partitioned device. In other words, the (emulated) sector-based storage of sector BDF 116 may be divided into one or more logical storage units, called partitions. Each partition may in effect represent a logical disk with its own system of sectors 94. Partitions may be implemented by, for example, dividing map 140 into one or more portions, each with an associated partition identifier, or by adding a partition identifier to each record 141. In a partitioned embodiment, routing 208 (discussed below) may include routing the direct read or write to the partitioned device. Routing 208 accordingly may include extracting a partition identifier associated with the data read or write and directing the read or write to the appropriate partition, however implemented in map 140

At routing 208, VDSS 114 may pass direct reads and writes to sector BDF 116, which may function as an interface to sector-based storage emulated by sector-to-data file 118. For example, for a direct read operation, VS 76 may generate a read request 154 that includes a sector identifier 142 indicating the sector(s) 94 to be read. VDSS 114 may extract the identifier 142 from the request 154 and (via sector BDF 116) use the identifier 142 to look up the associated sector data 144 in map 140. VDSS 114 may then return the associated sector data 144 to VS 76 via hypervisor 74 and virtual storage 78. The returned data may include identifier 142 and associated data 144.

In another example, for a direct write operation, VS 76 may generate a data write 150 that may include sector identifier(s) 142 and sector data 144 (user data) to be written there. VDSS 114 may extract the identifier(s) 142 from the direct write 150 and (via sector BDF 116) write sector data 144 to map 140 of file 118 at the requested location. Storage in map 140 may include both identifier 142 and data 144.

In an embodiment, map 140 may be implemented as a hash table. Routing at 208 accordingly may include the use of a hash function, for example, to translate identifiers 142 used as keys into a sector-to-data table (map 140) into an index into a hash array implementing map 140.

In an embodiment, routing at 208 may include extracting a partition identifier from the direct read or write and directing the read or write to the indicated partition. For example, a partitioned embodiment of VDSS 114 may include addressing data transfers by partition identifier and sector identifier, rather than by sector identifier alone. Routing at 208 thus may include resolving partition/sector addresses and reading or writing to the indicated partition and sector of map 140. In an embodiment, VDSS 114 may maintain multiple maps 140, for example, one map 140 for each partition.

Method 200 may further include hosting, at the computer system, the virtual system 76. The computer system may be or may include a virtualization host 72, which may run hypervisor 74 to support one or more VSs 76. "Hosting" may refer to the execution, by host 72 via hypervisor 74, of VS 76.

As should be appreciated, the preceding embodiment(s) is/are for illustrative purposes only. In embodiments, steps may be added or removed, and many steps may be performed at least partly in parallel. Different portions of a digital file, or different related digital files may be processed at the same time or prioritized for speed or transfer purposes. Processes such as searching for multiple patterns within arrays may be performed effectively or actually simultaneously. For example some or all processes may be threaded, using a single processor or multiple processors.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the embodiments in the form disclosed. Many modifications and variations will be apparent to those of ordinary skill in the art without departing from the scope and spirit of the embodiments of the disclosure. The embodiments were chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In an embodiment, the disclosure may be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, and pointing devices) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method, comprising:
    hosting a virtual system at a computer system, the computer system comprising a storage system configured to permit sector-based data transfers and file-based data transfers, wherein the storage system comprises a storage block device file (BDF) and a corresponding sector BDF, and wherein the sector BDF operates as a storage interface for sector-based data transfers;
    providing first access control data associated with the storage BDF to the virtual system, wherein the first access control data permits the virtual system to access the storage BDF;
    receiving a data read or write request from the virtual system;
    detecting whether the received data read or write request is sector-based or file-based, wherein the sector-based read or write is a direct read from or direct write addressed to one or more sectors of the storage system;
    in response to detecting a file-based read or write associated with a file, storing identification data associated with the virtual system within the file, and passing the file to a pass-through file system (PTFS) for storage; and
    in response detecting a sector-based read or write:
        determining if a sector-to-data file maintained by the sector BDF already exists for the virtual system, obtaining access to the sector-to-data file in response to determining that the sector-to-data file already exists, and creating a new sector-to-data file in response to determining that the sector-to-data file does not already exist, wherein the sector-to-data file stores one or more sector identifiers mapped to sector data to provide file-based storage for sector-based data transfers by the virtual system;
        hiding one or more objects from the virtual system, including the sector-to-data file;
        routing the sector based read or write to the sector BDF; and
        extracting a sector identifier from the sector-to-data file.

2. The method of claim 1, further comprising receiving a request to boot the virtual system.

3. The method of claim 1, wherein the one or more objects hidden by the host includes a hash table, and further comprising routing the sector-based read from or sector-based write to the hash table.

4. The method of claim 1, wherein the one or more objects hidden by the host includes a partitioned device, and further comprising routing the sector-based read from or sector-based write to the partitioned device.

5. The method of claim 1, wherein the received request is encrypted, and further comprising decrypting the received request prior to the routing.

6. The method of claim 1, wherein the hiding is selected from the group consisting of: providing access to the sector-to-data file and denying access to the sector-to-data file.

7. The method of claim 2, further comprising extracting, from the request to boot, data identifying the virtual system to be booted, wherein access to the sector-to-data file is obtained based on the extracted data.

8. The method of claim 7, further comprising executing a bootstrap loader stored in the sector-to-data file.

9. The method of claim 2, further comprising reading and executing boot-sector data stored in the sector-to-data file.

10. The method of claim 9, wherein the boot-sector data comprises a bootstrap loaded stored in the sector-data-file, and wherein extracting the boot-sector data comprises executing the bootstrap loader on behalf of a booting virtual system.

* * * * *